United States Patent [19]

Hermanson et al.

[11] 4,119,448
[45] Oct. 10, 1978

[54] APPARATUS AND METHOD FOR CONNECTING THE ENDS OF A CUT LENGTH OF RIBBON

[75] Inventors: Gerald P. Hermanson; David M. Rickel, both of Maitland; Robert J. Carr, Winter Park, all of Fla.

[73] Assignee: Dayron Corporation, Orlando, Fla.

[21] Appl. No.: 825,931

[22] Filed: Aug. 19, 1977

[51] Int. Cl.² .............................................. B29C 27/08
[52] U.S. Cl. .................................. 156/73.4; 156/580.1
[58] Field of Search ........................... 29/417, 564.8; 156/73.1, 580.1, 256, 512, 543; 264/23; 228/1 R

[56] References Cited

U.S. PATENT DOCUMENTS

| 3,556,912 | 1/1971 | Burgo et al. | 156/580.1 |
| 3,647,599 | 3/1972 | Gardner | 156/580.1 |
| 4,017,955 | 4/1977 | Hermanson et al. | 29/417 |

Primary Examiner—Douglas J. Drummond
Attorney, Agent, or Firm—Duckworth, Hobby, Allen & Pettis

[57] ABSTRACT

This invention relates to an improvement in an automatic apparatus and method for coupling a workpiece to a specified position along a continuous length of ribbon and then cutting a length of ribbon therefrom to a predetermined length, which improvement provides for grasping the cut length of ribbon and welding the ends together. A pair of clamping jaws grasps a piece of ribbon at a predetermined position just prior to cutting the ribbon from a continuous length of ribbon, then turns the ribbon to align the end over a sonic welding anvil, and welding the ends of the ribbon together and discharging the ribbon from the apparatus.

18 Claims, 6 Drawing Figures

APPARATUS AND METHOD FOR CONNECTING THE ENDS OF A CUT LENGTH OF RIBBON

BACKGROUND OF THE INVENTION

I. Field of the Invention

This invention is an improvement over our prior U.S. Pat. No. 4,017,955, dated Apr. 19, 1977, for an Apparatus For Attaching a Workpiece to A Continuous Length of Line, and reference may be had thereto for a better understanding of the present invention.

In this prior patent, an apparatus is provided for coupling a workpiece to a specified position along a continuous length of material, and then cutting the length of material therefrom to a predetermined length. The present improvement provides for an apparatus and method for grasping the cut length of material prior to the final cutting of the material then cutting the material and positioning the ends of the cut material in an ultrasonic welder, heat sealer, or similar joining apparatus, to fuse or coalesce the ends together with a predetermined overlap and then discharging the ribbon with connected ends and workpiece attached from the apparatus. Thus, an automatic apparatus attaches a workpiece and cuts the ribbon from a continuous length to a predetermined length and then the ends of the ribbon are joined to form an endless loop which is used as an operative element in a bomb fuze.

II. Description of the Prior Art

Heretofore it has been customary to couple a line or ribbon through a workpiece threading the ribbon through multiple sequential apertures located in the workpiece. It was then necessary to move the workpiece along the ribbon to the required position, and to tension the ribbon over the workpiece prior to cutting the ribbon to the predetermined length. Due to the complexity of the threading operation, it was often necessary to accomplish the entire procedure by hand labor, an operation which was both expensive and slow. In the alternative, complex threading machines were required to thread an end of the ribbon through the appropriate aperture in the workpiece. These threading machines were not only slow, but were also subject to breakdown when the subject threading element missed the aperture and was impaled upon the workpiece. Furthermore, even after the ribbon was threaded through the aperture in the workpiece, it was necessary to pull the ribbons through the workpiece with great accuracy so that the workpiece would be located at a specified position along the predetermined length of ribbon.

In response to these problems, an apparatus was developed utilizing an arcuate-shaped workpiece having special one-way apertures located adjacent each end thereof. One-way apertures were specially designed to receive a folded section of the ribbon when tension was placed upon the ribbon. It was folded to thereby retain the ribbon within the one-way aperture in the workpiece. By stuffing the folded ribbon through the one-way aperture, the necessity to pull the ribbon through the workpiece or to move the workpiece to the specific location along the ribbon was eliminated. This locating procedure is easily accomplished by prearranging the specified position of the ribbon adjacent to the one end apertures of the workpiece prior to the folding and stuffing process as taught in prior U.S. Pat. No. 4,017,955, dated Apr. 19, 1977. The ribbon having a workpiece attached at a predetermined position and cut to a predetermined length was then discharged into a receptacle where an operator fused the ends of the ribbon together in an ultrasonic welder. The present improvement to the prior apparatus and method provides for an apparatus for grasping the cut length of ribbon prior to the final cutting to a predetermined length then cutting the continuous length of ribbon to its predetermined length, then twisting the cut length of ribbon to place the ends on the anvil of an ultrasonic welder, fusing the ends together with a predetermined overlap to form an endless loop of predetermined length with a workpiece positioned at a predetermined position on the loop, and then discharging the ribbon for a later connection to a bomb fuze apparatus.

SUMMARY OF THE INVENTION

The present invention relates to a method and apparatus for grasping a cut length of ribbon and positioning the ends thereof in an ultrasonic welder with a predetermined overlap of the ends and connecting the ends to form an endless loop which apparatus and method forms a part of an apparatus and method for coupling a workpiece to a specified position along a continuous length of ribbon and then cutting a length of ribbon therefrom to a predetermined length. The improvement has two pair of clamping jaws for clamping the length of ribbon prior to the cutting to a predetermined length from a continuous length of ribbon, then cutting the predetermined length of ribbon from the continuous length thereof, then positioning the ends of the ribbon onto an anvil of an ultrasonic welder with a predetermined overlap of the ends of the ribbon and fusing the ends together to form an endless loop and finally, discharging the endless loop of ribbon having a workpiece attached thereto from the apparatus.

DESCRIPTION OF THE DRAWINGS

Other objects, features, and advantages of the present invention will be apparent from the written description and the drawings in which.

DETAILED DESCRIPTION OF THE PREFERRED EMBODIMENTS

Figure 1:
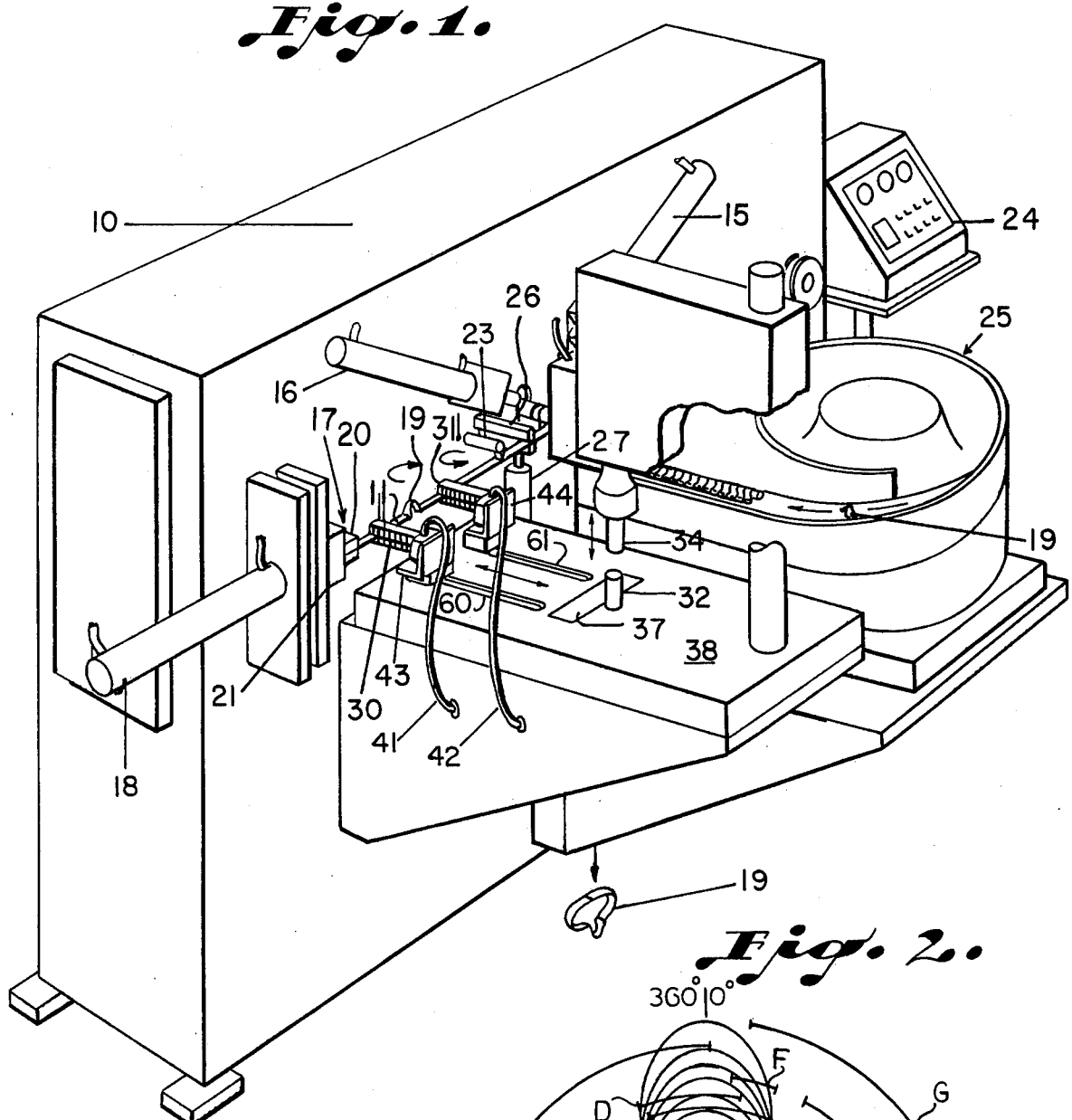
FIG. 1 is a frontal perspective view of an apparatus in accordance with the present invention.

An apparatus in accordance with the present invention is illustrated in the drawing, which is substantially the same as the invention of U.S. Pat. No. 4,017,955, except for the improvements in the handling of the cut ribbon.

Figure 3:
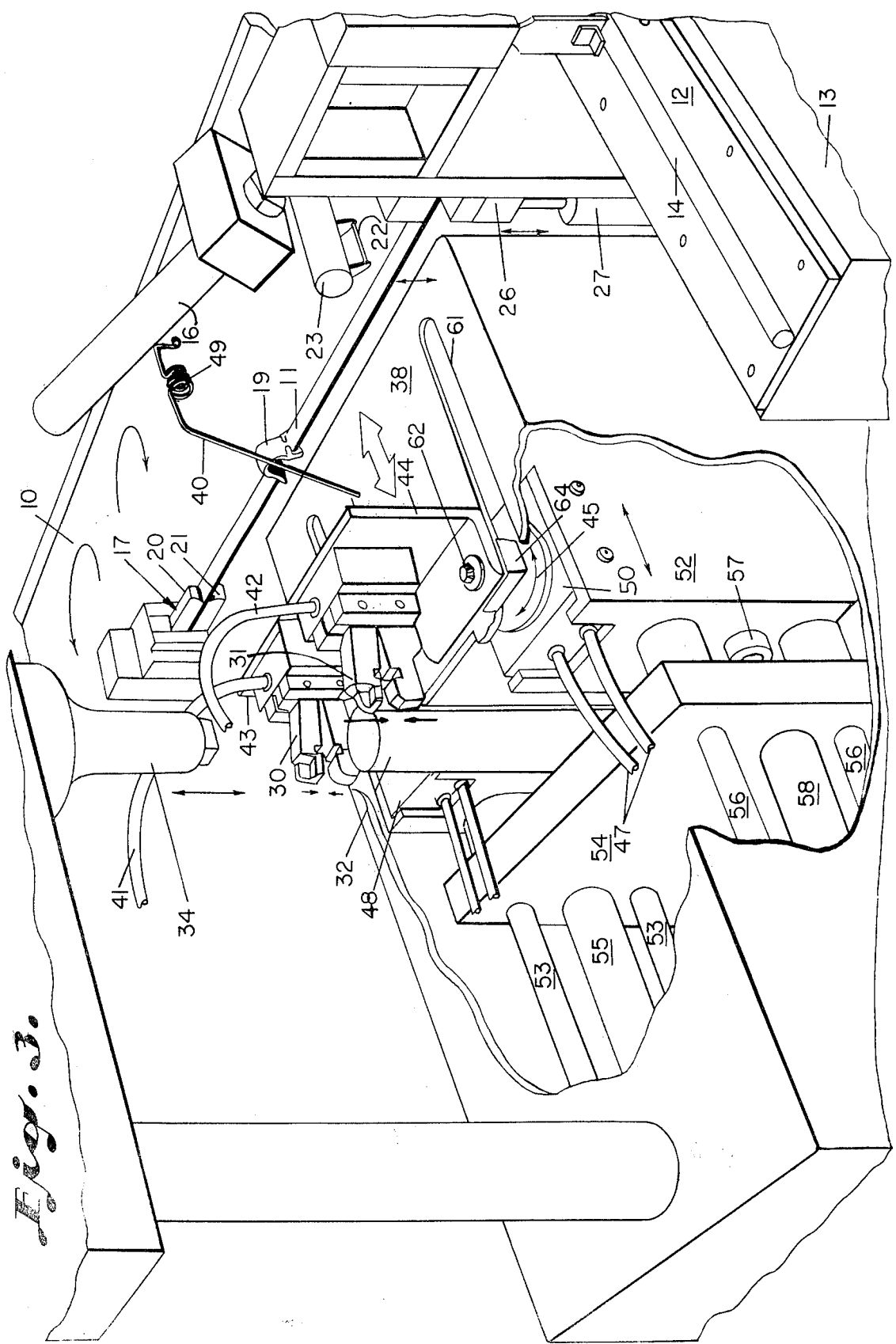
FIG. 3 is a perspective view of portions cut away in a starting position.

A frame 10 is illustrated in FIGS. 1 and 3, having a continuous nylon ribbon 11 being fed to the machine from one end and having a vibratory plate 12 mounted onto a frame portion 13 having a workpiece feed longitudinal guide member 14 thereon for feeding workpieces 15 to a mechanism for attaching the workpieces to the ribbon 11 which included a first stuffing cylinder 15 and a second stuffing cylinder 16, each for stuffing the ribbon into a portion of each workpiece 19. The ribbon is initially pulled to the next position by a pair of advance jaws 17 operated by advancing jaws cylinder 18 having an upper jaw 20 and a lower jaw 21 for moving forward to engage the ribbon adjacent the hot wire cutter 22, mounted to the cutter means 23. The cutter means on a predetermined timing stroke moves to cut the ribbon 11 with the hot wire cutter 22, and then moves out of the way, so that the advance jaws 17 can move forward and engage the ribbon and pull it through for the next position under the hot wire cutter 22. Simultaneously, it pulls the ribbon behind the hot wire cutter for positioning the ribbon for the next workpiece to be attached at a predetermined position. The present apparatus has a central control box 24 to centrally control the operation of the apparatus for incorporating the different switches and timing cam.

A vibratory feed bowl 25 has been added, which through vibrations, feeds the workpieces 15 in an upright position onto the workpiece feed guide member 14. The vibratory bowl feed 25 is a conventional feed used in a variety of industries. The advance jaws 17 advance and engage the ribbon 11 adjacent the hot wire cutter 22 and the return pulling the ribbon with it at which time the ribbon is grasped by the clamping jaws 26 and held taunt between the advance jaws 17 and the clamping jaws 26. Clamping jaws 26 are actuated by a cylinder 27 and then the ribbon 11 is cut by the hot wire cutter 22. The vibratory workpiece feed 14 feeds workpieces 19 to a support with the stuffing members 15 and 16 stuffing the ribbon into each side thereof at a predetermined position between the clamping jaws 26 and a pair of clamping jaws not illustrated. In the prior patent, once the hot wire cutter 22 cuts the ribbon 11 at the predetermined position, the jaws 17 release the ribbon and it is dropped on a guide into a receptacle.

Figure 4:
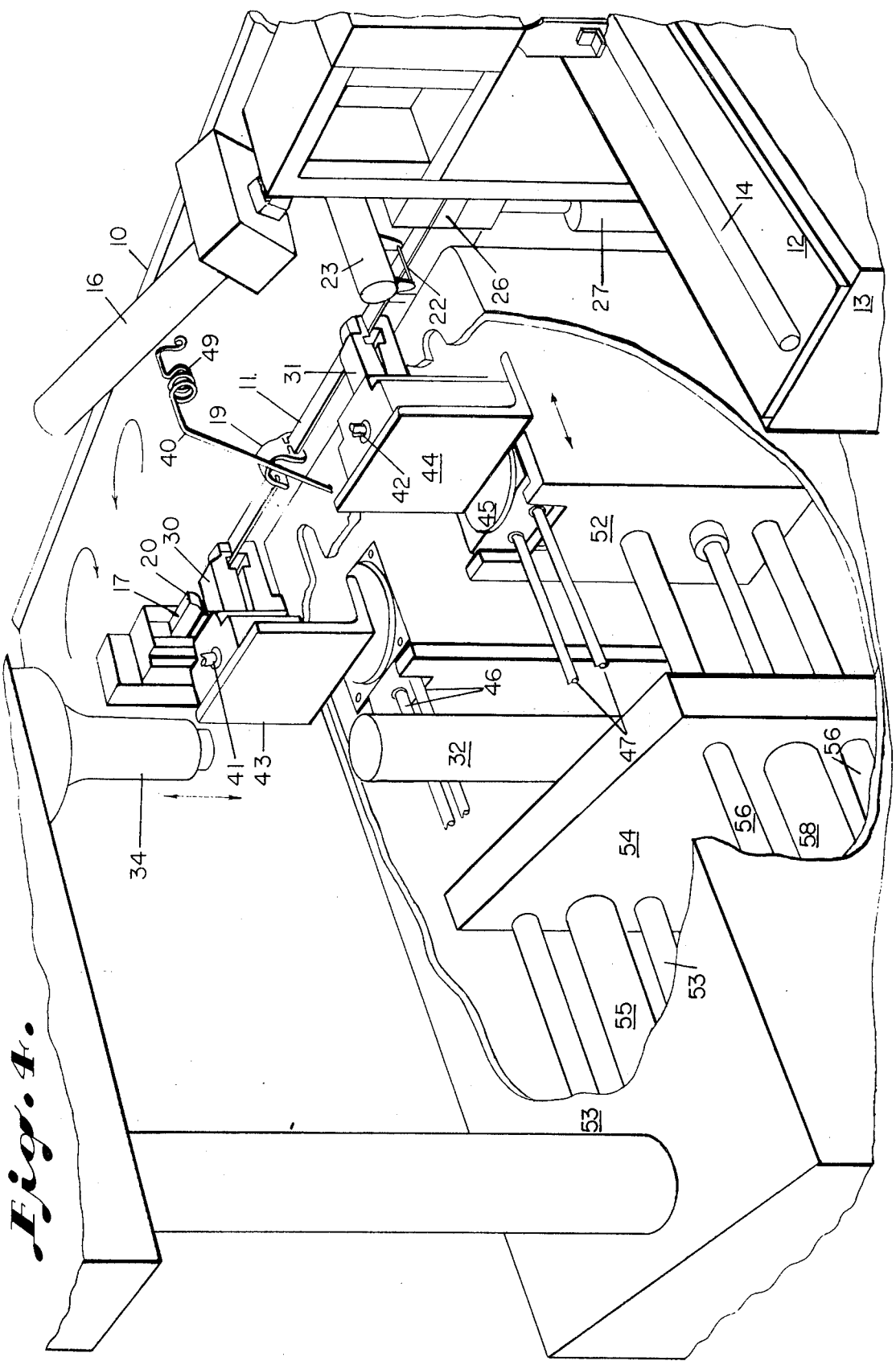
FIG. 4 is a perspective view in accordance with FIG. 2, with the apparatus in a clamping position.

In the present improvements, a pair of clamping jaws 30 and 31 are positioned at appropriate locations for grasping the ribbon 11 at that location between the jaws 17 and the hot wire cutter 22. Once the ribbon is clasped by the jaws 30 and 31, it is released by the advance jaws 17 and cut by the hot wire cutter 22, whereupon the jaws 30 and 31 are pulled back and rotated to position the ribbon as illustrated in FIG. 4 with the end of the cut ribbon overlapping on an anvil 32 of an ultrasonic welder 33. The ultrasonic welder thereupon has a welding post 34 which comes down upon the anvil and ends 35 and 36 of the ribbon 11 to fuse the ends together. A heat sealer or staking mechanism could alternatively be employed for connecting the ends of the ribbon. Once the jaws 30 and 31 are released, the ribbon is formed into an endless loop of a predetermined size having a workpiece 15 attached at a predetermined position and is dropped through an opening 37 in a base frame support 38. The workpiece 15 and ribbon are turned in the proper direction during the looping of the ribbon by a looping guide member 40 having a spring portion 49. The guide 40 is attached to the frame 10 in a position to engage the workpiece 15 attached to the ribbon 11 to twist the workpiece and the ribbon in a looping direction as the jaws 30 and 31 are rotated.

Jaw 30 is operated by an air line 41 while jaws 31 are operated by air line 42 which actuates small air actuators when air pressure is applied thereto. Hydraulic or electronic actuators also could be employed. The jaws 30 are mounted to a rotary base 43 while the jaws 31 are mounted to a rotary base 44, which are mounted to rotate on a solid lubricant disc 45 placed under each rotary base 43 and 44. The jaws are rotated by a rotary or mechanical air actuator which is activated for base 43 by a pair of air lines 46 and for base 44 by a pair of air lines 47. In addition, the rotary actuators 48 for jaws 30 and base 43 and for jaws 31 and jaw support 44 are mounted to a frame portion 51 and 52 respectively. The frame portion 51 is supported by a pair of sliding shafts 53 sliding in bushings in frame portion 54 and is driven by an air cylinder 55 also attached to the frame portion 54 with a driving rod attached to the frame 51. Frame portion 52 is supported by a pair of sliding shafts 56 and is driven by a rod 57 of a pneumatic cylinder 58 attached to the frame 54. Sliding shaft 56 slides in bushings mounted in the frame 54 in the same manner as the rods 53. The jaws 30 and 31, base members 43 and 44 are mounted through slots 60 and 61 in the base frame portion 38 with rotating shafts 62 and 63 protruding through spacers 64 for engaging the rotating members 43 and 44 for rotation upon actuation of the actuators 48 and 50.

Figure 5:
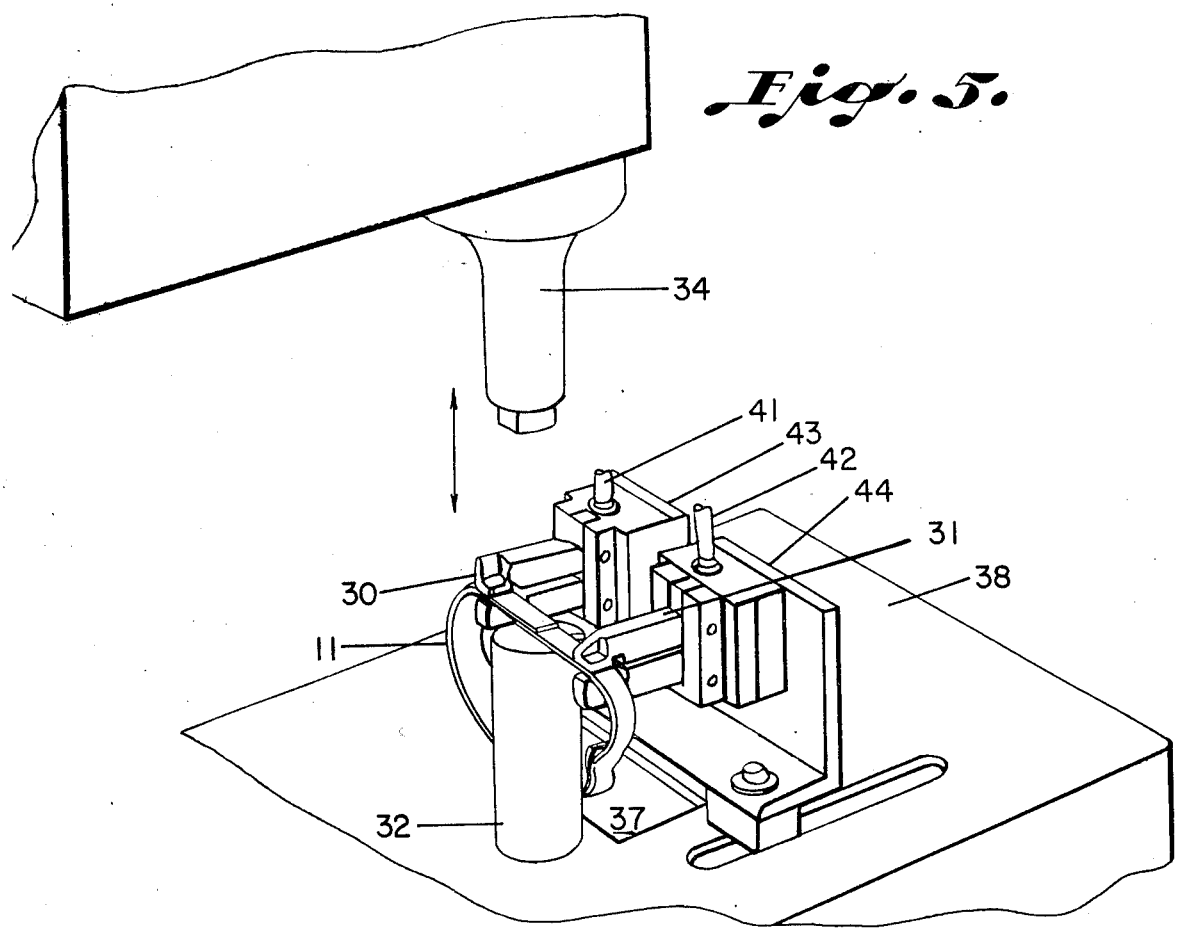
FIG. 5 is a perspective view of the clamping jaws positioning the ends of the ribbon on the anvil of the ultrasonic welder.
Figure 6:
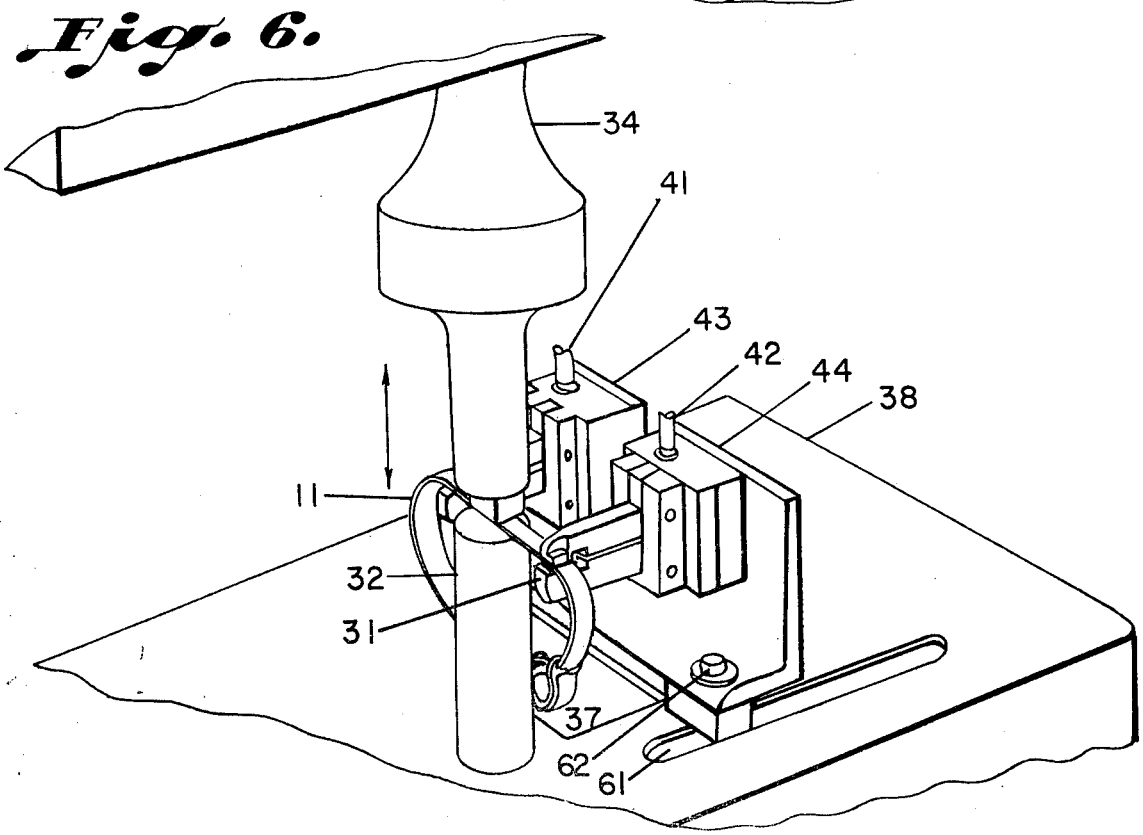
FIG. 6 is a perspective view of a portion of the apparatus during the fusing of the ends of the ribbon together.

In operation, the clamping jaws 30 and 31 are in the position as illustrated in FIG. 3, are rotated by actuating the rotary actuators 48 and 50 to face the ribbon 11 in its position as shown in FIGS. 1, 3, and 4. Then jaws 30 and 31 are then slid forward on the support shafts 53 and 56 by the pneumatic cylinders 55 and 58 with jaws 30 and 31 being in their normal open position, until the jaws extend over and under the ribbon 11 as illustrated in FIG. 4. The clamping jaws 30 and 31 are then actuated by the application of air pressure to the air lines 41 and 42 to close the jaws 30 and 31 to clamp the jaws upon the ribbon 11 at predetermined positions as determined by the positioning of the slots 60 and 61 support shafts 53 and 56 and the frame 54. Once the jaws 30 and 31 are clamped, the ribbon is cut with a hot wire cutter 22 or hot knife and the advance jaws 17 release the ribbon which is then supported by the clamping jaws 30 and 31. Clamping jaws 30 and 31 are then rotated with the jaws 30 rotating in a clockwise direction and the jaws 31 in a counter-clockwise direction towards each other thereby looping a portion of the ribbon 11 between the jaws 30 and 31. The ribbon is flipped down by the guide member 40 engaging the workpiece 10 at a downward angle to flip the ribbon in the proper direction as illustrated in FIG. 5 in which the ends 35 and 36 of the ribbon 11 has been placed on the anvil 32 of the ultrasonic welder 33. Jaws 33 and 34 are rotated by the rotating actuators 48 and 50 and simultaneously are retracted by the cylinders 55 and 58 to slide the jaws in the slots 60 and 61. Once the ribbon ends 35 and 36 are properly positioned and ultrasonic welder 33 is actuated to lower the ultrasonic welding post 34 into the ribbon ends as shown in FIG. 6, to sonically weld or fuze the ends together to form an endless loop of ribbon of a predetermined length having a workpiece 15 positioned at a predetermined position. When the welding is completed the clamping jaws 30 and 31 are released and the ribbon drops into a chute through the opening 37 where it can be delivered to a receptacle for attachment to a bomb fuze in a separate operation.

It should be clear that the operation of the machinery has been described in terms of the use of air cylinders and air actuators, but that hydraulic as well as electrical solenoids and cylinders can be used without departing from the spirit and scope of the invention. In addition, a pair of air lines 46 and 47 drive the rotary actuators 48 and 50 which allows the actuators to be driven in a clockwise and counter-clockwise in one rotation and to be driven in a reverse direction simultaneously for placing the jaws in a different position. Thus, the jaws are rotated and advanced to engage the ribbon and rotated in the opposite direction and retracted to position the ribbon, then released to discharge the endless looped ribbon portion.

Figure 2:
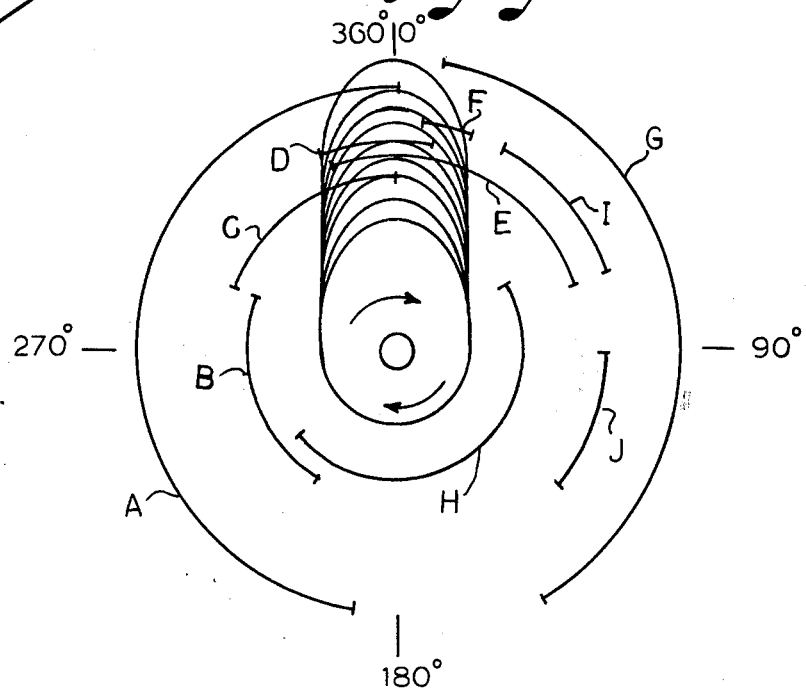
FIG. 2 is a diagrammatic view of the cycles for the major components of the system.

Timing is accomplished through a cam switch timer actuating time switches to operate valves for the air cylinders and might follow a 360° sequence in the present improvements of having the advance jaws 17 advanced and closed upon the ribbon 11 at 190° then have the main clamp 26 open at 210° followed by the advanced cylinder retracting pulling the tape to a new cut off position beginning at 230°. At 290° the main clamp can close again while the air signal off the main clamp 26 actuator 27 can shift the control valve to actuate the rotary actuators 48 and 50 to rotate the jaws 30 and 31 to the full pick-up position, and to simultaneously actuate the cylinder 55 and 58 to extend the jaws 30 and 31 forward to pick-up position. When the cylinders 55 and 58 are fully extended the air signal off the cylinder may shift a control valve which closes the jaws 30 and 31. The hot wire cutter 22 is actuated at 340° to the cutting positions, thus cutting the ribbon 11. At 0° the advance jaws 17 are opened and an air signal off the advance jaws actuator is actuated by the advance cylinder being fully retracted actuates the rotary actuators 48 and 50 to reverse the rotation of the jaws 30 and 31 to the weld position and to retract the cylinders 55 and 58 back to the welding position. The traveling of the air cylinder backwards trips an electrical switch which starts the weld cycle to lower the ultrasonic horn 34 into the anvil 32, and the power supply to actuate the ultrasonic welding horn automatically, and to open the clamping jaws 30 and 31. After the welding is complete, the ultrasonic horn raises to release the completed tape assembly. At 20° the hot wire cutter 22 retracts to its normal position and at 60° the advance cylinder extends the advance jaws to the end of the tape. FIG. 2 illustrates the cycles for components as follows:

A—Advance Jaws
B—Main clamp
C—Rotary Actuators 48 & 50
D—Hot Wire Cutter
E—Jaws 30 & 31
F—Lower Welder Horn
G—Weld Cycle
H—Advance Jaws Cylinder
I—Stuffer 15
J—Stuffer 16

It should be clear that the sequence for the improvements, of course, can be varied as desired without departing from the spirit and scope of the invention and that this sequence follows the timing sequence for the rest of the apparatus.

It should also be clear that the valves can be turned on not only by cam timing, but by the movement of different components actuating different switches both pneumatic or electrically without departing from the spirit and scope of the invention. The ultrasonic welder 33 is a conventional commercial ultrasonic welder complete with controls for actuating the lowering of the horn onto the anvil, welding and retracting of the horn. A method and apparatus has been provided for grabbing a tape in the proper sequence at the proper position from an apparatus which has attached a workpiece to the tape and cut the tape to a predetermined length, and to rotate one grabbed tape while simultaneously moving it to position the ends of the tape in an overlapping position onto an anvil of an ultrasonic welder and ultrasonically welding the ends and discharging the tape thereby producing an endless loop tape of predetermined size having a workpiece attached at a predetermined position in a predetermined manner. It should, however, be clear that the present invention is not to be construed as limited to the particular forms as disclosed herein which are to be considered illustrative rather than restrictive.

I claim:

1. In an apparatus for coupling a workpiece to a specified position along a continuous length of material and then cutting a length of material therefrom to a predetermined length, the improvement of an apparatus for grasping the cut length of material and connecting the ends together comprising in combination:

clamping means for clamping said length of material prior to cutting a portion from said continuous length of material, said clamping means having a first pair of jaws for disengagingly coupling to one end portion of said cut length of material and a second pair of jaws for disengagingly coupling to a second end portion of said cut length of material, said first pair of jaws and said second pair of jaws being attached to oppositely rotating bases for rotating said cut length of material to thereby loop said material;

positioning means for moving said clamping means to position the ends of said cut portion of said cut length of material adjacent each other in a position for fuzing said ends together;

welding means mounted to receive said ends of said cut portion and to fuse said ends together; and discharge means for discharging said cut and fuzed length of material whereby a length of material having a workpiece attached thereto is formed into an endless loop of predetermined size.

2. The apparatus in accordance with claim 1, in which said first pair of jaws and said second pair of jaws are connected to a sliding means for simultaneously sliding said rotating jaws.

3. The apparatus in accordance with claim 2, in which said first pair of jaws and said second pair of jaws clamp said cut portion of said length of material with predetermined end portions extending past each pair of jaws providing a predetermined overlap of said cut length of material to said fuzing means.

4. The apparatus in accordance with claim 2, in which guide means guides said cut length of material in said clamping means during the positioning of said jaws to direct said clamped material to form a loop.

5. The apparatus in accordance with claim 4, in which said guide means is attached to engage said workpiece attached to said cut length of material.

6. The apparatus in accordance with claim 5, in which said first pair of jaws and said second pair of jaws are pneumatically actuated jaws having air lines connected thereto for opening and closing said jaws responsive to pneumatic pressure.

7. The apparatus in accordance with claim 6, in which said first pair of jaws rotary means and said second pair of jaws rotary means each have a pair of pneumatic lines connected thereto for rotating said pair of jaws in a clockwise or counter-clockwise direction responsive to pneumatic pressure through said pneumatic lines.

8. The apparatus in accordance with claim 7, in which said first pair of jaws and second pair of jaws sliding means includes a pair of air cylinders attached to a fixed frame member and having their rods attached to a pair of sliding frame members for said jaws for sliding said jaws responsive to air pressure in said cylinders.

9. The apparatus in accordance with claim 8, in which said fuzing means includes an ultrasonic welder, heat sealer or staking apparatus actuated upon an anvil and said cut length of material ends are placed on said anvil for fuzing or attaching said ends together.

10. The apparatus in accordance with claim 9, in which said discharge means includes a discharge chute discharging said cut length of ribbon following the fuzing of the ends of said ribbon together.

11. A method of cutting a length of material from a continuous length of material to a predetermined length and fusing the ends of said cut length of material together to form a continuous loop comprising the steps of:
  clamping the end portion of a length of material on a continuous length of material in predetermined positions with a pair of clamping jaws;
  cutting said end portion of said continuous length of material at a predetermined position;
  looping said cut end portion of material by rotating said pair of clamping jaws in opposite direction to overlap said ends of said cut end portion of material
  fusing said ends of said cut length of material together; and
  discharging said endless loop of material.

12. A method in accordance with claim 11, in which the steps of looping includes guiding said cut end portion of material with a guide member to loop the material during the rotation of said pair of clamping jaws.

13. The method in accordance with claim 12, in which the steps of looping includes sliding said pair of clamping jaws during the rotation thereof for positioning said ends of said cut end portion of material in a predetermined position upon an anvil.

14. The method in accordance with claim 13, in which the step of fusing includes ultrasonic fuzing of the ends of said cut length of material together on said anvil.

15. The method in accordance with claim 14, in which the steps of discharging said endless loop of material includes releasing said pair of clamping jaws and dropping said endless loop of material into a chute.

16. The method in accordance with claim 15, in which said step of clamping the end of a length of material includes rotating and sliding said pair of jaws following the discharge of one endless loop of material into a position for clamping the end portion of length of material on a continuous length of material and clamping said end portion of said length of material.

17. The method in accordance with claim 16, including the step of releasing said length of material from a pair of continuous length of material advancing jaws following clamping of said end portion of said length of material.

18. The method in accordance with claim 17, including advancing the end portion of a length of material from a continuous length with said advancing jaws prior to clamping the end portion of material in a predetermined position.

* * * * *